United States Patent
Kai et al.

(10) Patent No.: US 12,469,167 B2
(45) Date of Patent: Nov. 11, 2025

(54) POSITIONING DEVICE, ESTIMATION METHOD, AND NON-TRANSITORY COMPUTER-READABLE MEDIUM

(71) Applicant: NEC Corporation, Tokyo (JP)

(72) Inventors: Natsuki Kai, Tokyo (JP); Takahiro Shiroshima, Tokyo (JP); Hideo Saito, Kanagawa (JP); Masahiro Yamaguchi, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 359 days.

(21) Appl. No.: 18/010,495

(22) PCT Filed: Apr. 28, 2021

(86) PCT No.: PCT/JP2021/017033
§ 371 (c)(1),
(2) Date: Dec. 15, 2022

(87) PCT Pub. No.: WO2021/256103
PCT Pub. Date: Dec. 23, 2021

(65) Prior Publication Data
US 2023/0245341 A1    Aug. 3, 2023

(30) Foreign Application Priority Data
Jun. 19, 2020  (JP) .................. 2020-105747

(51) Int. Cl.
*G06T 7/73*    (2017.01)
*G06T 17/05*   (2011.01)

(52) U.S. Cl.
CPC ............. *G06T 7/73* (2017.01); *G06T 17/05* (2013.01)

(58) Field of Classification Search
CPC .. G06T 7/73; G06T 17/05; G06T 2207/30244; G06T 7/74; G05D 1/02
See application file for complete search history.

(56) References Cited

U.S. PATENT DOCUMENTS

2010/0329513 A1* 12/2010 Klefenz ............... G06T 7/73
                                                    348/148
2019/0220997 A1*  7/2019 Asai ................. G01C 21/3822
                         (Continued)

FOREIGN PATENT DOCUMENTS

| JP | 2016-536668 A | 11/2016 |
| JP | 2019-133658 A | 8/2019 |
| JP | 2020-021257 A | 2/2020 |

OTHER PUBLICATIONS

International Search Report for PCT Application No. PCT/JP2021/017033, mailed on Jul. 27, 2021.

*Primary Examiner* — Stephen R Koziol
*Assistant Examiner* — Michael Kim Maiden (57) ABSTRACT

A positioning device includes an acquisition unit that acquires an environmental map of a target area being generated by using an image processing technique for estimating a three-dimensional shape of a target included in a two-dimensional image, and a plurality of captured images being used for generating the environmental map, an image retrieval unit that extracts, from a plurality of the captured images, a similar image having a feature vector similar to a feature vector determined based on a feature amount included in an input image, and an estimation unit that estimates a position and an attitude of an imaging device that has captured the input image by using a first feature point group of the input image and a third feature point group in the environmental map associated to a second feature point group of the similar image being matched with the first feature point group.

12 Claims, 8 Drawing Sheets

(56) References Cited

U.S. PATENT DOCUMENTS

| | | | |
|---|---|---|---|
| 2020/0042010 A1* | 2/2020 | Nakajima | G05D 1/0246 |
| 2020/0302686 A1* | 9/2020 | Totty | G06T 7/174 |

\* cited by examiner

POSITIONING DEVICE, ESTIMATION METHOD, AND NON-TRANSITORY COMPUTER-READABLE MEDIUM

This application is a National Stage Entry of PCT/JP2021/017033 filed on Apr. 28, 2021, which claims priority from Japanese Patent Application 2020-105747 filed on Jun. 19, 2020, the contents of all of which are incorporated herein by reference, in their entirety.

TECHNICAL FIELD

The present disclosure relates to a positioning device, an estimation method, and a program.

BACKGROUND ART

In recent years, a service assuming that a robot moves autonomously has become popular. In order for a robot to move autonomously, it is necessary for the robot to recognize a surrounding environment and estimate an own position with high accuracy. Therefore, a visual simultaneous localization and mapping (VSLAM) that generates a map of the surrounding environment from a video captured by the robot, and simultaneously executes estimation of a self-position has been studied.

In a typical VSLAM, the same point is recognized as a feature point in a plurality of videos (images) captured by a camera mounted on a robot. Further, it is performed that a position of the camera is estimated from a difference between the images of the feature point, and the position of the camera is recognized as a position of the robot from an estimation result. In such a VSLAM, since immediate processing is required, there is no time margin for performing detailed calculation, an error occurs between an actual position of the robot and a position estimated by the VSLAM, and the error is accumulated as an accumulation error every time a time elapses, thereby resulting in a larger error.

Therefore, as a mechanism for correcting the camera position in the VSLAM having the accumulation error, a mechanism using together with a map generated in advance is used.

Patent Literature 1 discloses processing of constructing a map by using consecutive frame images. Specifically, Patent Literature 1 discloses that matching is performed on feature points in two adjacent frame images, and a relative attitude between a current frame image and an immediately preceding frame image is calculated.

CITATION LIST

Patent Literature

[Patent Literature 1] Japanese Unexamined Patent Application Publication No.2019-133658

SUMMARY OF INVENTION

Technical Problem

Patent Literature 1 discloses that matching between a feature point included in a region of interest (ROI) of a target image and a feature point included in an ROI of a frame image used when constructing a map is performed. Further, Patent Literature 1 discloses that a relative attitude between a target image and a frame image used when constructing a map is calculated. However, in a case where a degree of similarity between the target image and the frame image is low, there is a problem that an error in matching of the feature points occurs and calculation accuracy of the relative attitude is lowered.

One of objects of the present disclosure is to provide a positioning device, an estimation method, and a program that are capable of reducing a ratio of errors in matching of feature points and improving calculation accuracy of a relative attitude.

Solution to Problem

A positioning device according to a first aspect of the present disclosure includes: an acquisition unit configured to acquire an environmental map of a target area being generated by using an image processing technique for estimating a three-dimensional shape of a target included in a two-dimensional image, and a plurality of captured images being used for generating the environmental map; an image retrieval unit configured to extract, from a plurality of the captured images, a similar image having a feature vector similar to a feature vector determined based on a feature amount included in an input image; and an estimation unit configured to estimate a position and an attitude of an imaging device that has captured the input image by using a first feature point group of the input image and a third feature point group in the environmental map associated to a second feature point group of the similar image being matched with the first feature point group.

An estimation method according to a second aspect of the present disclosure includes: acquiring an environmental map of a target area being generated by using an image processing technique for estimating a three-dimensional shape of a target included in a two-dimensional image, and a plurality of captured images being used for generating the environmental map; extracting, from a plurality of the captured images, a similar image having a feature vector similar to a feature vector determined based on a feature amount included in an input image; and estimating a position and an attitude of an imaging device that has captured the input image by using a first feature point group of the input image and a third feature point group in the environmental map associated to a second feature point group of the similar image being matched with the first feature point group.

A program according to a third aspect of the present disclosure causes a computer to execute: acquiring an environmental map of a target area being generated by using an image processing technique for estimating a three-dimensional shape of a target included in a two-dimensional image, and a plurality of captured images being used for generating the environmental map; extracting, from a plurality of the captured images, a similar image having a feature vector similar to a feature vector determined based on a feature amount included in an input image; and estimating a position and an attitude of an imaging device that has captured the input image by using a first feature point group of the input image and a third feature point group in the environmental map associated to a second feature point group of the similar image being matched with the first feature point group.

ADVANTAGEOUS EFFECTS OF INVENTION

According to the present disclosure, it is possible to provide a positioning device, an estimation method, and a

EXAMPLE EMBODIMENT

First Example Embodiment

Hereinafter, example embodiments of the present disclosure will be described with reference to the drawings. A configuration example of a positioning device 10 according to a first example embodiment will be described by using FIG. 1. The positioning device 10 may be a computer device that operates by a processor executing a program stored in a memory. The positioning device 10 may be a server device.

Figure 1:
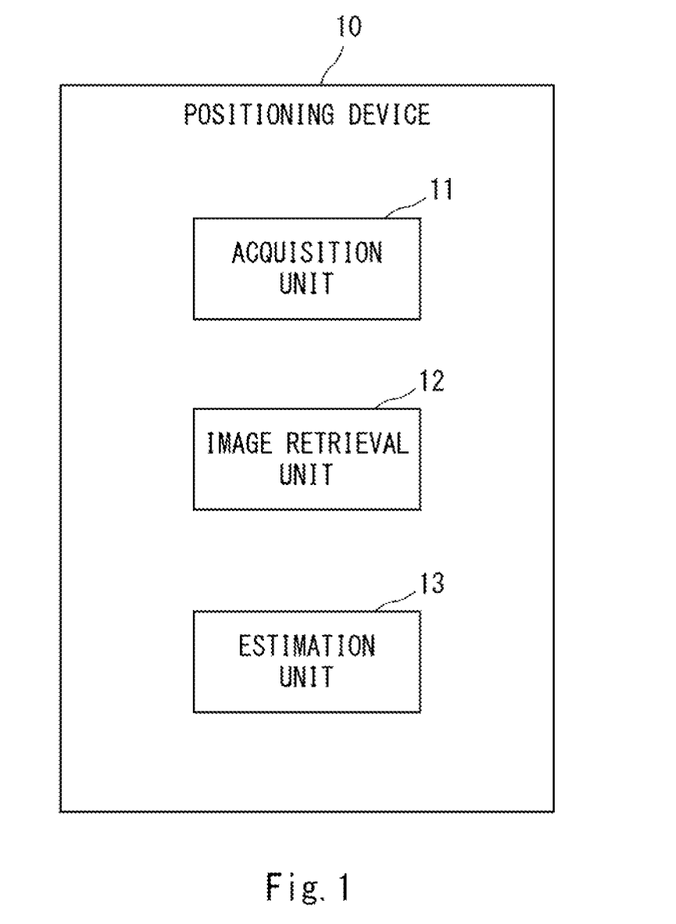
FIG. 1 is a configuration diagram of a positioning device according to a first example embodiment.

The positioning device 10 includes an acquisition unit 11, an image retrieval unit 12, and an estimation unit 13. The acquisition unit 11, the image retrieval unit 12, and the estimation unit 13 may be software or a module in which processing is executed by a processor executing a program stored in a memory. Alternatively, the acquisition unit 11, the image retrieval unit 12, and the estimation unit 13 may be hardware such as a circuit or a chip.

The acquisition unit 11 acquires an environmental map of a target area being generated by using an image processing technique for estimating a three-dimensional shape of a target included in a two-dimensional image, and a plurality of captured images being used for generating the environmental map. The image processing technique for estimating a three-dimensional shape of a target included in a two-dimensional image may be, for example, structure from motion (SfM). Acquiring an environmental map means that data indicating an environmental map are acquired, and acquiring a captured image means that data indicating a captured image are acquired. The captured image is also referred to as a frame image or simply a frame in the following description. In the SfM, all feature points appearing in a plurality of captured images that have already been captured are calculated, and from among all the calculated feature points, a feature point to be matched is estimated with respect to a plurality of images that are temporally before and after each other. Further, in the SfM, a three-dimensional position of an imaging device that has captured each captured image is estimated based on a difference of a position on a two-dimensional plane in the captured image in which each feature point appears. The captured image is, for example, a two-dimensional image, and may be referred to as a frame.

Information indicating the estimated three-dimensional position of the imaging device is referred to as an environmental map.

Further, the environmental map also indicates a three-dimensional shape of a target object in a target area capturing in the captured image. In other words, by generating the environmental map, a feature point on a three-dimensional space associated to a feature point on a two-dimensional plane in the captured image is specified. The feature point on the three-dimensional space may be referred to as a feature point in the environmental map. The captured image includes a plurality of feature points. The plurality of feature points may be referred to as a feature point group.

The image retrieval unit 12 extracts, from a plurality of captured images, a similar image having a feature vector similar to a feature vector determined based on a feature amount included in an input image. The input image is an image captured in an imaging device being required to estimate a position and an attitude. The feature amount included in the input image and the captured image is information acquired by digitizing a feature in the image. For example, the feature amount may be indicated by using an oriented FAST and rotated BRIEF (ORB), a histogram of oriented gradient (HOG), a scale-invariant feature transform (SIFT), or the like. The feature vector may be a histogram of a feature amount. The image retrieval unit 12 may compare the feature vector of the input image with the feature vector of the captured image, and extract the captured image having a feature vector indicating the highest similarity score as the similar image. Since calculation of the similarity score uses a general method being used in performing image retrieval, detailed description thereof will be omitted. It is assumed that the higher the similarity score, the higher a degree of similarity between images.

The estimation unit 13 estimates a position and an attitude of the imaging device that has captured the input image. The estimation unit 13 estimates the position and the attitude of the imaging device by using a feature point group of the input image and a feature point group in the environmental map associated to a feature point group of the similar image being matched with the feature point group of the input image.

As described above, the positioning device 10 extracts a similar image similar to an input image from among a plurality of captured images being used in SfM for generating an environmental map. Further, the positioning device 10 estimates a position and an attitude of an imaging device that has captured the input image by using the input image and the similar image. In addition, extraction of the similar image is performed by comparing feature vectors determined based on a feature amount. Thus, the positioning device 10 can use a similar image having a high degree of similarity with the input image when estimating the position and the attitude of the imaging device that has captured the input image. As a result, matching accuracy of feature points between the input image and the similar image is improved, and calculation accuracy of a relative attitude in the positioning device 10 can be improved.

Second Example Embodiment

Figure 2:
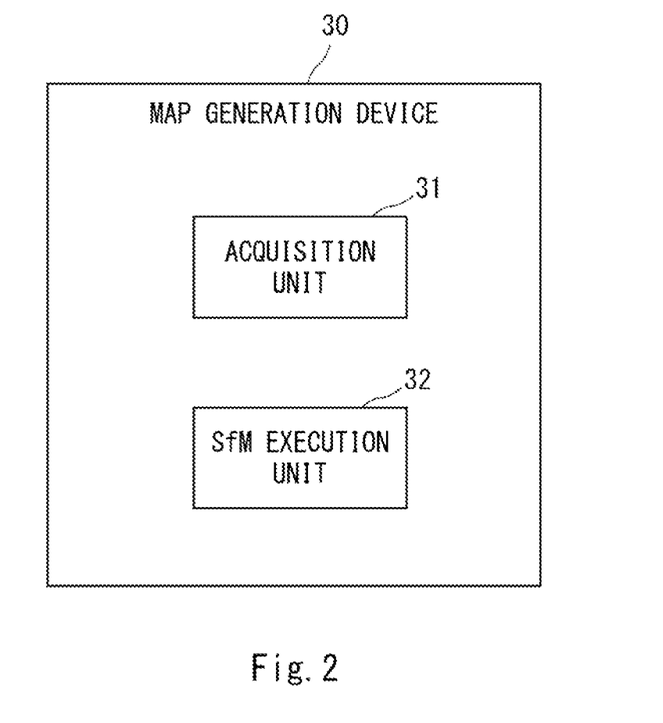
FIG. 2 is a configuration diagram of a map generation device according to a second example embodiment.

A configuration example of a map generation device 30 according to a second example embodiment will be described by using FIG. 2. The map generation device 30 is a computer device that operates by a processor executing a program stored in a memory. The map generation device 30 may be a server device. The map generation device 30 is a device that executes pre-processing. The pre-processing is processing for generating SfM related information including an environmental map by using SfM before executing real-time position estimation by using VSLAM. The pre-processing may be referred to as offline processing because the pre-processing is completed in processing of the map generation device 30 alone. In the following, an example in which the map generation device 30 executes pre-processing will be described, but the pre-processing may be executed in a positioning device 20 described later. In other words, in a case where the map generation device 30 is used integrally with the positioning device 20 described later, the offline processing may be executed in the positioning device 20.

The map generation device 30 includes an acquisition unit 31 and an SfM execution unit 32. The acquisition unit 31 and the SfM execution unit 32 may be software or a module in which processing is executed by a processor executing a program stored in a memory. Alternatively, the acquisition unit 31 and the SfM execution unit 32 may be hardware such as a circuit or a chip.

The acquisition unit 31 acquires a plurality of captured images used for SfM. The captured image is an image acquired by capturing a target object existing in a target area. The target area may be, for example, an area where a robot, automatic guided vehicle (AGV), or the like moves. The target object may be, for example, a person, an animal, a plant, or the like, or may be a structure such as a building or a wall.

The acquisition unit 31 may acquire a captured image from a camera or the like that has captured an image in the target area via a network (communication network) such as a wireless communication line or a wired communication line. Alternatively, the acquisition unit 31 may acquire a captured image via a portable recording medium or the like. Alternatively, in a case where a camera is mounted in the map generation device 30, the acquisition unit 31 receives a captured image being captured by the camera in the map generation device 30.

The SfM execution unit 32 executes the SfM using a plurality of captured images. The SfM execution unit 32 generates SfM related information including an environmental map by executing the SfM. The SfM execution unit 32 generates a highly accurate environmental map by executing feature point matching and local and global bundle adjustment of a plurality of captured images in the SfM.

The environmental map is a three-dimensional map indicating a position and an attitude of an imaging device that has captured the target area, and a three-dimensional shape of the target object in the target area. The environmental map may be referred to as a deepness map, a depth map, or the like. Further, the SfM execution unit 32 executes the SfM and generates an environmental map, and thereby generates a bag of words (BoW) database, 2D-3D pair information, and feature point information together (herein, 2D represents two dimensions, and 3D represents three dimensions). The SfM related information is information including an environmental map, a BoW database, 2D-3D pair information, and feature point information.

The BoW may be referred to as a bag of features, a bag of keypoints, or the like. The BoW database is a database that manages a feature vector used in calculating a degree of similarity of an image. For example, the map generation device 30 clusters a plurality of feature amounts included in an image, and divides each of feature amounts into clusters. Further, the map generation device 30 may use a histogram of a representative feature amount among the feature amounts included in each of the clusters as the feature vector. The feature amount may be, for example, a HOG feature amount, a SIFT feature amount, or the like. The BoW database manages a plurality of captured images used in executing the SfM and feature vectors related to each of the captured images in association with each other.

The feature point information may be, for example, information related to a feature amount indicated by a feature point in a two-dimensional image. For example, the feature point information may be information indicating a HOG feature amount, a SIFT feature amount, or the like.

The 2D-3D pair information is information that correlates (associates) a feature point in the two-dimensional image with a feature point in the environmental map associated to the feature point in the two-dimensional image. The feature point in the two-dimensional image is referred to as, for example, a 2D point. In addition, the feature point in the environmental map in a three-dimensional space is referred to as, for example, a 3D point. The 2D-3D pair information is information indicating a combination in which a 2D point and a 3D point associated to the 2D point are correlated (associated) with each other.

The SfM related information further includes a plurality of captured images used in generating an environmental map. In other words, the SfM related information includes an environmental map, a BoW database, 2D-3D pair information, feature point information, and a plurality of captured images used in generating the environmental map. The map generation device 30 transmits the SfM related information to the positioning device 20.

Figure 3:
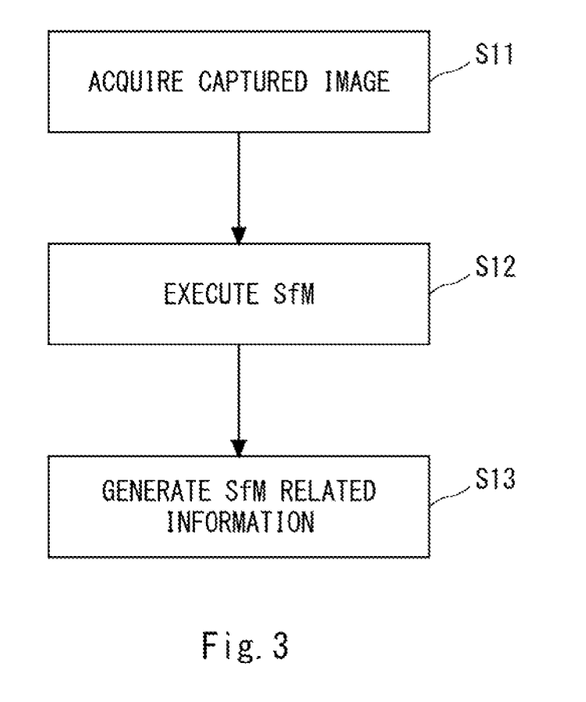
FIG. 3 is a diagram illustrating a flow of pre-processing executed in the map generation device according to the second example embodiment.

Subsequently, by using FIG. 3, a flow of the pre-processing executed in the map generation device 30 will be described. First, the acquisition unit 31 acquires a plurality of captured images used in SfM (S11). Next, the SfM execution unit 32 executes the SfM using the captured image acquired in step S11 (S12). Herein, the SfM execution unit 32 generates SfM related information including an environmental map by executing the SfM (S13).

Figure 4:
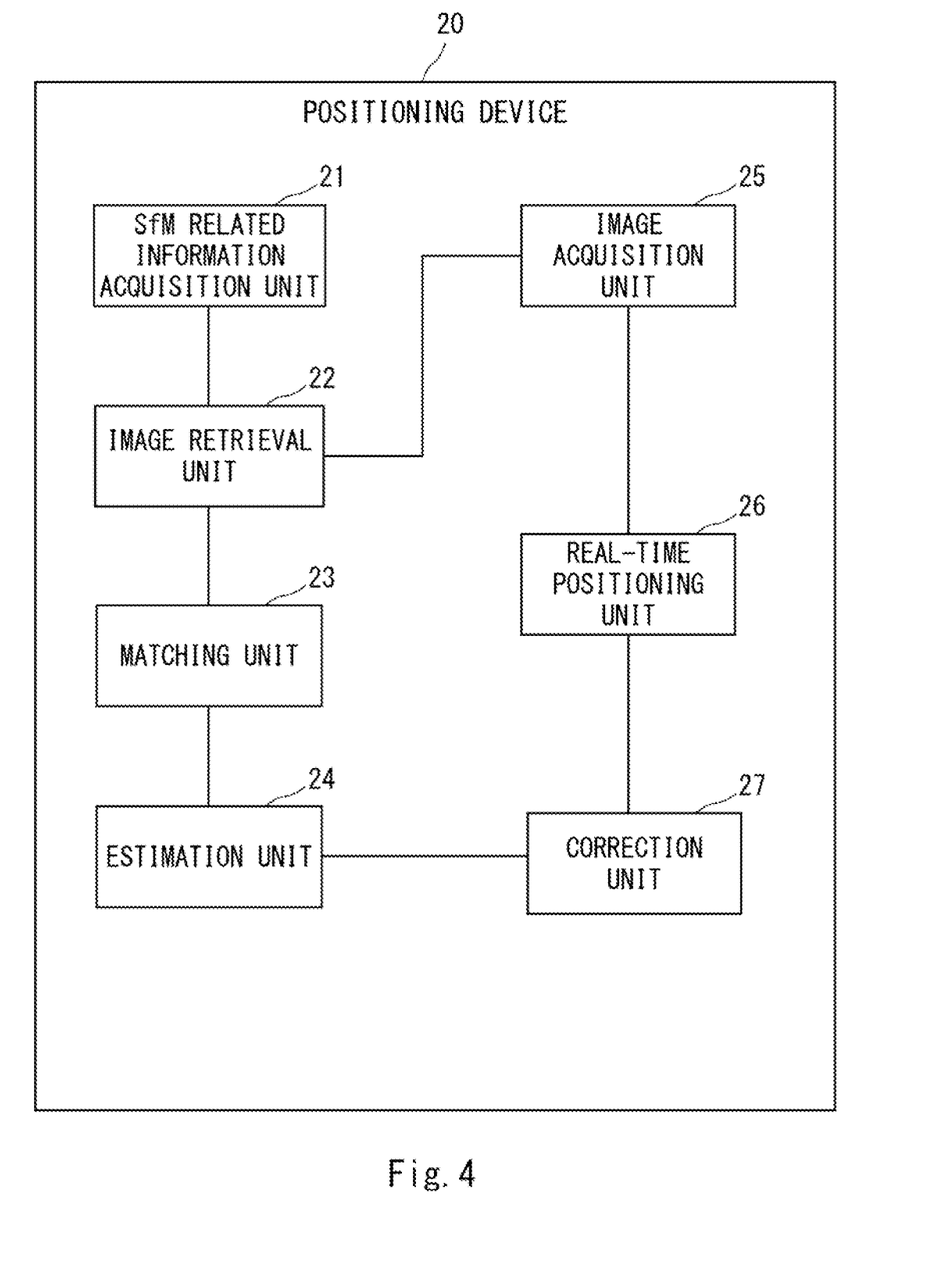
FIG. 4 is a configuration diagram of a positioning device according to the second example embodiment.

Subsequently, a configuration example of the positioning device 20 according to the second example embodiment will be described by using FIG. 4. The positioning device 20 measures a real-time position and attitude of a moving robot, AGV, or the like. The positioning device 20 acquires an image captured in a moving robot, AGV, or the like via a network, and performs analysis processing of the acquired image. Therefore, processing executed in the positioning device 20 may be referred to as online processing. An image captured by a moving robot, AGV, or the like has similar meaning to an image captured by a camera mounted on or built in a moving robot, AGV, or the like.

The positioning device 20 includes an SfM related information acquisition unit 21, an image retrieval unit 22, a matching unit 23, an estimation unit 24, an image acquisition unit 25, a real-time positioning unit 26, and a correction unit 27. Components of the positioning device 20 such as the SfM related information acquisition unit 21, the image retrieval unit 22, the matching unit 23, the estimation unit 24, the image acquisition unit 25, the real-time positioning unit 26, and the correction unit 27 may be hardware such as a circuit or a chip. Alternatively, the components of the positioning device 20 may be software or a module in which processing is executed by a processor executing a program stored in a memory.

The SfM related information acquisition unit 21 is equivalent to an acquisition unit 11 in FIG. 1. The image retrieval unit 22 is equivalent to an image retrieval unit 12 in FIG. 2. The estimation unit 24 is equivalent to an estimation unit 13 in FIG. 1.

The image acquisition unit 25 acquires a captured image captured in an AGV. Hereinafter, an example in which a captured image captured in the AGV is mainly used will be described. However, in the following description, the captured image captured in the AGV may be replaced with a captured image captured in a robot, another autonomously moving object, or a computer device. The captured image captured in the moving AGV is an image used for estimating a position and an attitude of the moving AGV. The captured image captured in the moving AGV may be referred to as, for example, a real-time image. The real-time image is equivalent to an input image described in FIG. 1.

The image acquisition unit 25 may acquire a real-time image from the AGV via a network. The image acquisition unit 25 may acquire the real-time image periodically, or may acquire the real-time image irregularly. For example, the image acquisition unit 25 may shorten an interval for acquiring the real-time image in a case where a moving speed of the AGV is fast, and may lengthen the interval for acquiring the real-time image in a case where the moving speed of the AGV is slow. Whether the moving speed is fast or slow may be determined according to whether the moving speed is faster or slower than a speed being a threshold value. The moving speed of the AGV may be calculated, for example, by acquiring global positioning system (GPS) information (global navigation satellite system (GNSS) information) of the AGV, based on the acquired GPS information. In addition, the AGV may determine an interval at which the real-time image is transmitted to the positioning device 20 according to the moving speed of the own device. The image acquisition unit 25 outputs the real-time image to the image retrieval unit 22.

The SfM related information acquisition unit 21 receives SfM related information transmitted from the map generation device 30. The SfM related information acquisition unit 21 may receive the SfM related information from the map generation device 30 via a network, or may acquire the SfM related information from a portable recording medium or the like. Alternatively, in a case where the SfM related information is generated in the positioning device 20, the SfM related information acquisition unit 21 may acquire the SfM related information generated in the positioning device 20. The SfM related information acquisition unit 21 outputs the SfM related information to the image retrieval unit 22.

The image retrieval unit 22 retrieves an image similar to the real-time image received from the image acquisition unit 25 from among a plurality of captured images included in the SfM related information. For example, the image retrieval unit 22 retrieves an image similar to the real-time image by using feature vectors of each of captured images managed in the BoW database.

Specifically, the image retrieval unit 22 calculates a feature vector of the real-time image. Further, the image retrieval unit 22 compares the feature vector of the real-time image with the feature vectors of each of the captured images managed in the BoW database. The image retrieval unit 22 compares the feature vector of the real-time image with each of the feature vectors managed in the BoW database, and calculates a similarity score indicating a degree of similarity between the images.

The image retrieval unit 22 extracts N (N is an integer of one or more) captured images in descending order of the similarity score acquired as a result of comparing the feature vector of the real-time image with the feature vectors of each of the images, from the SfM related information as an image similar to the real-time image. The number of extracted images may be determined in advance. Alternatively, the image retrieval unit 22 may set a threshold value of the similarity score in advance, and may not extract a captured image indicating the similarity score equal to or less than the threshold value even when the similarity score of the image is in an N-th place.

The matching unit 23 performs feature point matching by using the real-time image and each of the N similar images. For example, the matching unit 23 may match a 2D point in the real-time image with a 2D point in the similar image, based on the feature point information. Herein, the matching unit 23 specifies a 3D point correlated with the matched 2D point in the similar image by using the 2D-3D pair information included in the SfM related information. The matching unit 23 generates a pair (hereinafter, referred to as a 2D-3D pair for position correction) of the 2D point in the real-time image and the 3D point correlated with the 2D point in the similar image being matched with the 2D point in the real-time image. The matching unit 23 performs feature point matching on each of the N similar images, and generates a plurality of 2D-3D pairs for position correction.

Herein, in a case where the total number of matching when the feature point matching between the real-time image and the N similar images is performed is less than a threshold value, the image retrieval unit 22 may increase a value of N, which is the number of captured images to be extracted. Further, the image retrieval unit 22 may decrease a threshold value of the similarity score. In addition, in a case where the total number of matching is equal to or larger than the threshold value, the image retrieval unit 22 may decrease the value of N, which is the number of captured images to be extracted. Further, the image retrieval unit 22 may increase the threshold value of the similarity score. Since a matter that the total number of matching is small indicates that a degree of similarity of the extracted similar images is low, the value of N is increased in order to increase the number of matching, and the number of similar images to be extracted is increased. In addition, since a matter that the total number of matching is large indicates that the degree of similarity of the extracted similar image is high, the value of N is decreased in order to decrease the number of mis-matchings, and the number of similar images to be extracted is decreased. The mis-matching is to match feature points indicating different target objects or positions with each other.

A changed value N and a changed threshold value of the similarity score are used for extraction processing of the similar image in the image retrieval unit 22, which is executed when a new real-time image is acquired.

The estimation unit 24 estimates a position and an attitude of the AGV by using a plurality of 2D-3D pairs for position correction. For example, the estimation unit 24 estimates the position and the attitude of the AGV by solving a perspective n point (PnP) problem by using a plurality of 2D-3D pairs for position correction. Further, the estimation unit 24 may improve estimation accuracy of the position and the attitude of the AGV by performing random sample consensus (RANSAC) processing as robust estimation.

The real-time positioning unit 26 positions or estimates the position and the attitude of the AGV by using the real-time image acquired in the image acquisition unit 25. For example, the real-time positioning unit 26 may position or estimate the position and the attitude of the AGV by executing the VSLAM by using the real-time image.

The correction unit 27 corrects the position and the attitude of the AGV estimated in the real-time positioning unit 26 by using the position and the attitude of the AGV estimated in the estimation unit 24. Specifically, the correction unit 27 corrects an error occurring between a position of the AGV estimated by using the VSLAM and an actual position of the AGV by using the position of the AGV estimated in the estimation unit 24.

Figure 5:
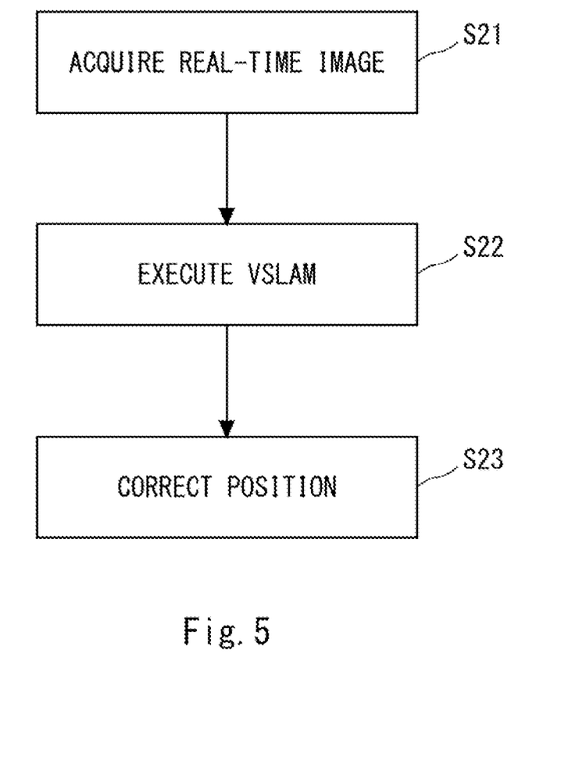
FIG. 5 is a diagram illustrating a flow of online processing executed in the positioning device according to the second example embodiment.

Subsequently, a flow of online processing executed in the positioning device 20 according to the second example embodiment will be described by using FIG. 5. First, the image acquisition unit 25 acquires a real-time image captured by a camera mounted on the AGV via a network (S21). Next, the real-time positioning unit 26 executes the VSLAM by using the real-time image acquired in step S21 (S22). By executing the VSLAM, the real-time positioning unit 26 estimates a position and an attitude of the AGV that has captured the real-time image.

Next, the correction unit 27 corrects the position and the attitude of the AGV estimated in step S22, based on a position and an attitude of the AGV estimated by using an environmental map generated in advance (S23).

Figure 6:
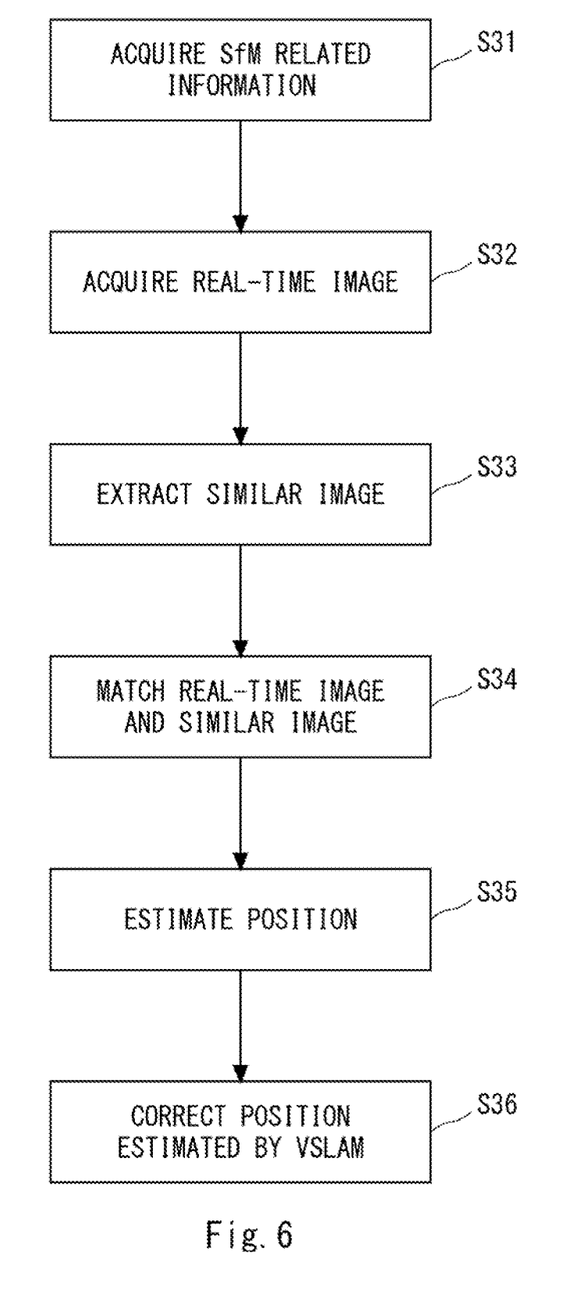
FIG. 6 is a diagram illustrating a flow of correction processing executed in the positioning device according to the second example embodiment.

Subsequently, details of correction processing executed in step S23 in FIG. 5 will be described by using FIG. 6. First, the image retrieval unit 22 acquires SfM related information from the SfM related information acquisition unit 21 (S31). The SfM related information includes an environmental map, a BoW database, 2D-3D pair information, feature point information, and a plurality of captured images used in generating the environmental map.

Next, the image retrieval unit 22 acquires a real-time image captured by the AGV (S32). Next, the image retrieval unit 22 extracts a similar image similar to the real-time image from among the plurality of captured images included in the SfM related information (S33). For example, the image retrieval unit 22 compares a feature vector related to the real-time image with feature vectors of the captured images managed in the BoW database, and extracts N captured images as similar images in descending order of a similarity score.

Next, the matching unit 23 performs feature point matching by using feature point information of the real-time image and the similar image (S34). In other words, the matching unit 23 performs the following processing in S34. First, the matching unit 23 specifies a 2D point in the similar image that matches a 2D point in the real-time image by referring to the feature point information. Next, the matching unit 23 correlates (associates) the 2D point in the real-time image with a 3D point associated to the specified 2D point in the similar image, and thereby generates a 2D-3D pair for position correction.

Next, the estimation unit 24 estimates the position and the attitude of the AGV that has captured the real-time image by using the 2D-3D pair for position correction (S35). Next, the correction unit 27 corrects an error occurring between the position estimated by using the VSLAM and the position of an actual robot or the like, by using the position of the AGV estimated in the estimation unit 24 (S36).

As described above, the positioning device 20 according to the second example embodiment extracts N similar images similar to a real-time image. As a result, the matching unit 23 can generate a large number of 2D-3D pairs for position correction as compared with a case where a real-time image and one similar image are matched. The estimation unit 24 can improve estimation accuracy of the position and the attitude of the AGV by using a large number of 2D-3D pairs for position correction.

In a case where a real-time image and a similar image are matched with each other, there is a case where, although feature points are actually different from each other, mis-matching that matches the similar feature points with each other may occur. As the occurrence of mis-matching increases, the estimation accuracy of the position and the attitude of the AGV also decreases. On the other hand, by matching a real-time image with a plurality of similar images, it is possible to increase the number of matching and decrease a ratio of mis-matching. As a result, it is possible to reduce influence of the mis-matching on the estimation of the position and the attitude.

Third Example Embodiment

Figure 7:
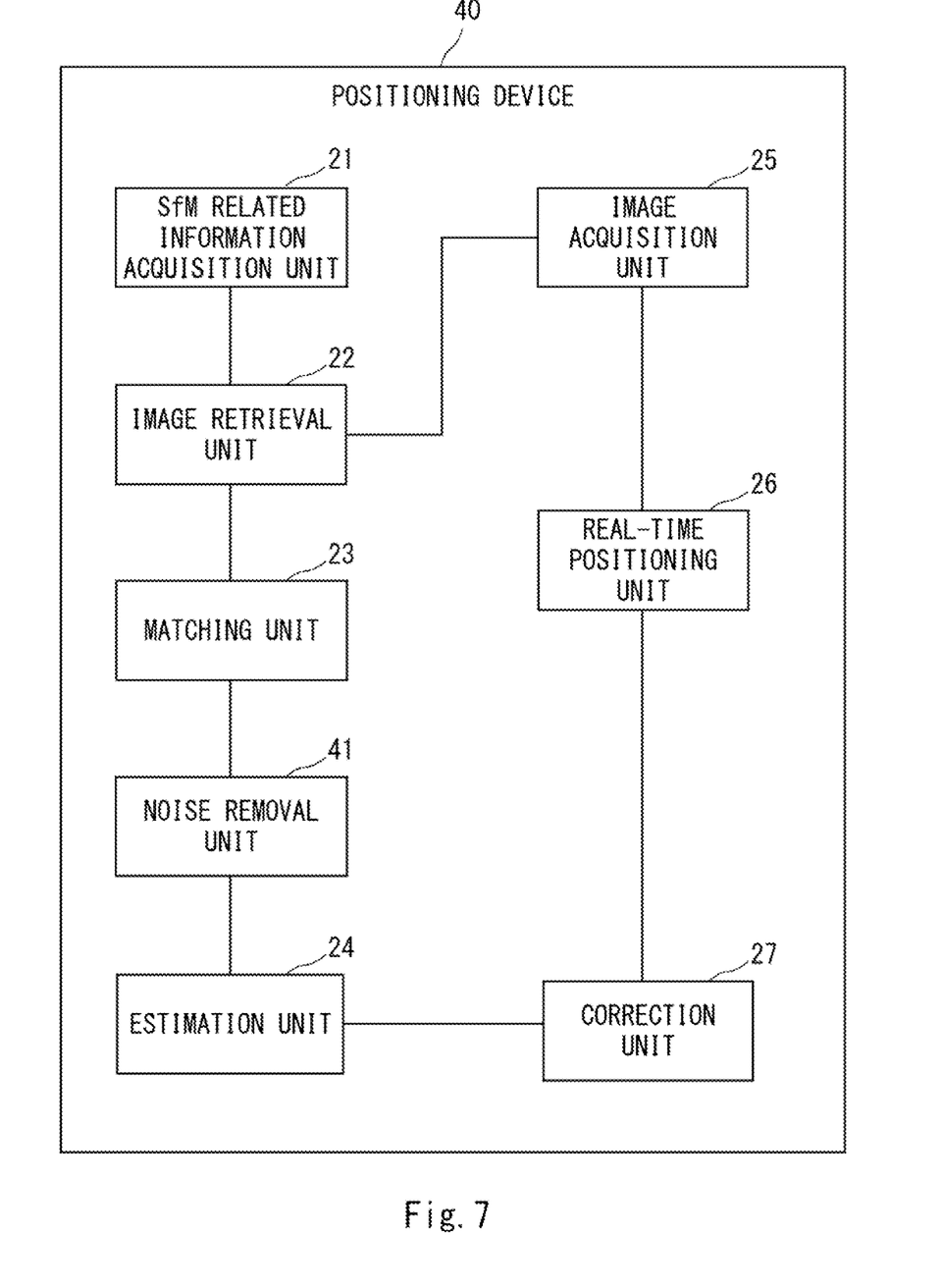
FIG. 7 is a configuration diagram of a positioning device according to a third example embodiment.

Subsequently, a configuration example of a positioning device 40 according to a third example embodiment will be described by using FIG. 7. The positioning device 40 has a configuration in which a noise removal unit 41 is added to a positioning device 20 in FIG. 4. In the following description, a detailed description of a configuration similar to that of the positioning device 20 in FIG. 4 among the configuration of the positioning device 40 will be omitted.

The noise removal unit 41 removes a 2D-3D pair for position correction including a 3D point estimated as noise from among a plurality of 2D-3D pairs for position correction generated in a matching unit 23. Specifically, the noise removal unit 41 estimates a 3D point that becomes noise by using a position of an AGV being estimated based on an (i−1)th (i is an integer of two or more) real-time image and a 2D-3D pair for position correction being generated based on an i-th real-time image.

The noise removal unit 41 performs statistical processing using distance information from the position of the AGV being estimated based on the (i−1)th real-time image to the 3D point included in the 2D-3D pair for position correction being generated based on the 1-th real-time image. The noise removal unit 41 specifies a 3D point being regarded as noise in the statistical processing. As the statistical processing, for example, a threshold value determination or a Smirnov test using a mean and a variance may be used.

More specifically, in a case where the distance between the position of the AGV and the position of the 3D point in an XYZ space (i.e., a three-dimensional coordinate space including an X-axis, a Y-axis, and a Z-axis) exceeds a threshold value, it may be determined that the 3D point includes noise. Alternatively, in the XYZ space, the noise removal unit 41 may acquire a distance for each of an X component, a Y component, and a Z component between the position of the AGV and the 3D point, and in a case where any of the X component, the Y component, and the Z component exceeds a threshold value, it may be determined that noise is included in the 3D point. The distance for each of the X component, the Y component, and the Z component may be a difference between the X component, the Y component, and the Z component indicating the position of the AGV and the X component, the Y component, and the Z component indicating the position of the 3D point, respectively.

Alternatively, in the XYZ space, the noise removal unit 41 may project the position of the AGV and the 3D point on an XY plane, a YZ plane, and an XZ plane, and acquire the distance between the position of the AGV and the 3D point projected on each of the planes. In this case, when the distance in any of the XY plane, the YZ plane, and the XZ plane exceeds the threshold value, the noise removal unit 41 may determine that noise is included in the 3D point.

The threshold value in the XYZ space may be $\mu+\alpha\sqrt{(V)}$, for example, in a case where $\mu$ is an average of distances D between the 3D points included in all 2D-3D pairs for the position correction being generated in the matching unit 23 and the position of the AGV, and V is a variance of the distance D. $\alpha$ is a coefficient. The $\sqrt{(V)}$ indicates a root V. The threshold values for each of the X component, the Y component, and the Z component, and the threshold values in each of the planes may be determined similar to the threshold value in the XYZ space.

The noise removal unit 41 may calculate the distance on the XYZ space, the distance on each of the X component, the Y component, and the Z component, and at least one distance and a threshold value of the distance on each of the planes, and determine presence or absence of noise.

In addition, it may be determined whether a 3D point determined by a $D_{i+1}$ by using a distance $D_i$ between the 3D point included in the 2D -3D pair for position correction being generated based on the 1-th real-time image and the AGV is equivalent to noise. For example, in a case where a difference between the $D_{i+1}$ and the $D_i$ exceeds a predetermined value, it may be determined that the 3D point determined by the $D_{i+1}$ is equivalent to noise.

An estimation unit 24 estimates a position and an attitude of the moving AGV by using a remaining 2D -3D pair for position correction being generated in the matching unit 23 from which the 2D -3D pair for position correction including the 3D point estimated as noise is removed from a plurality of the 2D -3D pairs for position correction.

As described above, the positioning device 40 removes a 2D -3D pair for position correction being generated in the matching unit 23 and including a 3D point being estimated as noise, from a plurality of the 2D -3D pairs for position correction. In a case where a position of the AGV estimated in a real-time positioning unit 26 is corrected by using a position of the AGV estimated by using the 2D -3D pair for position correction including the 3D point estimated as noise, correction accuracy for correcting to a correct position is reduced. On the other hand, the positioning device 40 removes the 2D -3D pair for position correction including the 3D point estimated as noise, and corrects the position of the AGV estimated in the real-time positioning unit 26 by using the position of the AGV estimated by using the remaining 2D -3D pair for position correction. Accordingly, it is possible to improve correction accuracy for correcting the position of the AGV estimated in the real-time positioning unit 26 to the correct position.

In addition to estimation of noise of the 3D point described above, the noise removal unit 41 may determine whether the 3D point is noise, for example, according to whether a reprojection error when the 3D point is reprojected to a captured image exceeds a threshold value.

Figure 8:
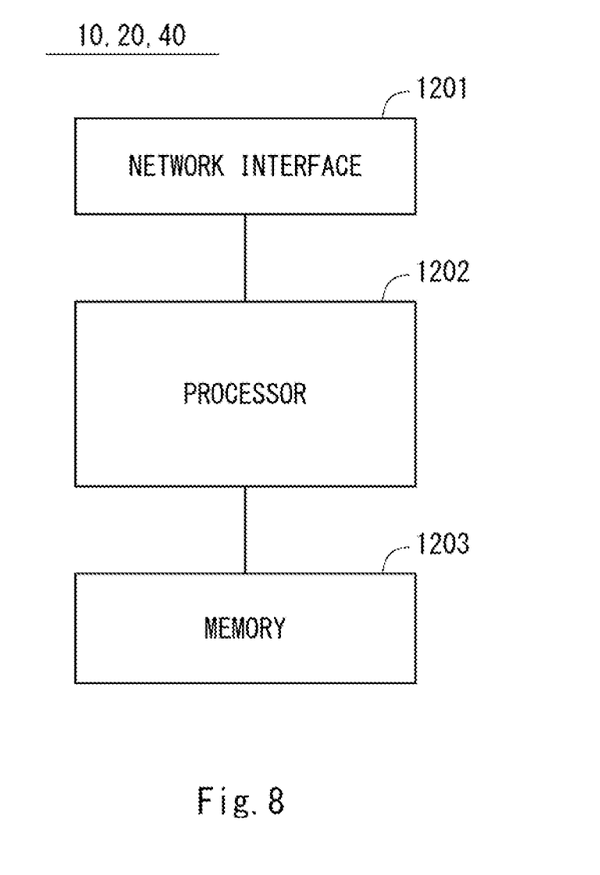
FIG. 8 is a configuration diagram of a positioning device according to each of example embodiments.

FIG. 8 is a block diagram illustrating a configuration example of the positioning device 10, the positioning device 20, and the positioning device 40 (hereinafter, referred to as a positioning device 10 or the like). Referring to FIG. 8, the positioning device 10 and the like include a network interface 1201, a processor 1202, and a memory 1203. The network interface 1201 is used for communicating with a network node (e.g., an eNB, an MME, a P-GW,). The network interface 1201 may include, for example, a network interface card (NIC) compliant with IEEE 802.3 series. Herein, an eNB represents an evolved node B, an MME represents a mobility management entity, a P-GW represents a packet data network gateway. IEEE represents the Institute of Electrical and Electronics Engineers.

The processor 1202 reads software (a computer program) from the memory 1203 and executes the software (computer program), and thereby performs processing of the positioning device 10 and the like described by using the flowchart in the above-described example embodiments. The processor 1202 may be, for example, a microprocessor, an MPU, or a CPU. The processor 1202 may include a plurality of processors.

The memory 1203 is configured by a combination of a volatile memory and a non-volatile memory. The memory 1203 may include a storage disposed away from the processor 1202. In this case, the processor 1202 may access the memory 1203 via an input/output (I/O) interface being not illustrated.

In the example in FIG. 8, the memory 1203 is used for storing a software module group. The processor 1202 reads the software module group from the memory 1203 and execute the read software module group, and thereby can perform the processing of the positioning device 10 and the like described in the above-described example embodiments.

As described by using FIG. 8, each of the processors included in the positioning device 10 and the like in the above-described example embodiments executes one or a plurality of programs including an instruction group for causing a computer to perform an algorithm described by using the drawings.

In the examples described above, a program can be stored by using various types of non-transitory computer readable media, and supplied to a computer. The non-transitory computer readable medium includes various types of tangible storage media. Examples of the non-transitory computer readable medium include a magnetic recording medium (e.g., a flexible disk, a magnetic tape, a hard disk drive), a magneto-optical recording medium (e.g., a magneto-optical disk), a CD-read only memory (ROM), a CD-R, a CD-R/W, and a semi-conductor memory (e.g., a mask ROM, a programmable ROM (PROM), an erasable PROM (EPROM), a flash ROM, a random access memory (RAM)). In addition, the program may also be supplied to the computer by various types of transitory computer readable media. Examples of the transitory computer readable medium include an electric signal, an optical signal, and an electromagnetic wave. The transitory computer readable medium can supply the program to the computer via a wired communication path such as an electric wire and an optical fiber, or a wireless communication path.

Note that, the present disclosure is not limited to the above-described example embodiments, and can be modified as appropriate within a range not deviating from the gist.

Some or all of the above-described example embodiments may also be described as the following supplementary notes, but are not limited thereto.

Supplementary Note 1

A positioning device comprising:

acquisition means for acquiring an environmental map of a target area being generated by using an image processing technique for estimating a three-dimensional shape of a target included in a two-dimensional image, and a plurality of captured images being used for generating the environmental map;

image retrieval means for extracting, from a plurality of the captured images, a similar image having a feature vector similar to a feature vector determined based on a feature amount included in an input image; and estimation means for estimating a position and an attitude of an imaging device that has captured the input image by using a first feature point group of the input image and a third feature point group in the environmental map associated to a second feature point group of the similar image being matched with the first feature point group.

Supplementary note 2

The positioning device according to Supplementary note 1, wherein the image retrieval means is configured to compare a feature vector determined based on a feature amount included in the input image with a feature vector determined based on a feature amount included in each of the captured images, and extract the captured image indicating a highest similarity score from the environmental map as the similar image.

Supplementary Note 3

The positioning device according to Supplementary note 1 or 2, wherein the image retrieval means is configured to compare a feature vector determined based on a feature amount included in the input image with a feature vector determined based on a feature amount included in each of the captured images, and extract a plurality of the captured images as the similar image in a descending order of similarity score.

Supplementary Note 4

The positioning device according to Supplementary note 3, wherein the image retrieval means is configured to increase the number of similar images to be extracted from a plurality of the captured images in a case where the number of matching at a time of matching the first feature point group of the input image and the second feature point group of a plurality of the captured images being extracted as the similar image is lower than a threshold value of the number of matching, and decrease the number of similar images to be extracted from a plurality of the captured images in a case where the number of matching exceeds the threshold value of the number of matching.

Supplementary Note 5

The positioning device according to Supplementary note 3 or 4, wherein the image retrieval means is configured to extract a plurality of the captured images indicating a similarity score higher than a score threshold value, as the similar image.

Supplementary Note 6

The positioning device according to Supplementary note 5, wherein the image retrieval means is configured to decrease the score threshold value in a case where the number of matching at a time of matching the first feature point group of the input image and the second feature point group of a plurality of the captured images being extracted as the similar image is lower than a threshold value of the number of matching, and increase the score threshold value in a case where the number of matching exceeds the threshold value of the number of matching.

Supplementary Note 7

The positioning device according to any one of Supplementary notes 1 to 6, further comprising noise removal means for removing a point that becomes noise, based on distance information from a position of the imaging device to each of points included in the third feature point group.

Supplementary Note 8

The positioning device according to any one of Supplementary notes 1 to 7, further comprising:

real-time positioning means for positioning a real-time position and a real-time attitude of the imaging device by using the input image; and correction means for correcting a position and an attitude of the imaging device being positioned in the real-time positioning means by using a position and an attitude of the imaging device being estimated in the estimation means.

(Supplementary Note 9

An estimation method comprising:

acquiring an environmental map of a target area being generated by using an image processing technique for estimating a three-dimensional shape of a target included in a two-dimensional image, and a plurality of captured images being used for generating the environmental map; extracting, from a plurality of the captured images, a similar image having a feature vector similar to a feature vector determined based on a feature amount included in an input image; and estimating a position and an attitude of an imaging device that has captured the input image by using a first feature point group of the input image and a third feature point group in the environmental map associated to a second feature point group of the similar image being matched with the first feature point group.

Supplementary Note 10

The estimation method according to Supplementary note 9, further comprising, when extracting the similar image, comparing a feature vector determined based on a feature amount included in the input image with a feature vector determined based on a feature amount included in each of the captured images, and extracting a plurality of the captured images as the similar image in a descending order of similarity score.

Supplementary Note 11

The estimation method according to Supplementary note 9 or 10, further comprising, when estimating a position and an attitude of the imaging device, removing a point that becomes noise, based on distance information from a position of the imaging device to each of points included in the third feature point group.

Supplementary note 12

A non-transitory computer-readable medium storing a program causing a computer to execute:

acquiring an environmental map of a target area being generated by using an image processing technique for estimating a three-dimensional shape of a target included in a two-dimensional image, and a plurality of captured images being used for generating the environmental map;

extracting, from a plurality of the captured images, a similar image having a feature vector similar to a feature vector determined based on a feature amount included in an input image; and estimating a position and an attitude of an imaging device that has captured the input image by using a first feature point group of the input image and a third feature point group in the environmental map associated to a second feature point group of the similar image being matched with the first feature point group.

Supplementary Note 13

The non-transitory computer-readable medium storing the program according to Supplementary note 12, further causing a computer to execute, when extracting the similar image, comparing a feature vector determined based on a feature amount included in the input image with a feature vector determined based on a feature amount included in each of the captured images, and extracting a plurality of the captured images as the similar image in a descending order of similarity score.

Supplementary Note 14

The non-transitory computer-readable medium storing the program according to Supplementary note 12 or 13, further causing a computer to execute, when estimating a position and an attitude of the imaging device, removing a point that becomes noise, based on distance information from a position of the imaging device to each of points included in the third feature point group.

Although the invention of the present application has been described above with reference to the example embodiments, the invention of the present application is not limited to the above. Various modifications can be made to the configuration and details of the invention of the present application which can be understood by a person skilled in the art within the scope of the invention.

This application is based upon and claims the benefit of priority from Japanese patent application No. 2020-105747, filed on Jun. 19, 2020, the disclosure of which is incorporated herein in its entirety by reference.

REFERENCE SIGNS LIST

10 POSITIONING DEVICE
11 ACQUISITION UNIT
12 IMAGE RETRIEVAL UNIT
13 ESTIMATION UNIT
20 POSITIONING DEVICE
21 SfM RELATED INFORMATION ACQUISITION UNIT
22 IMAGE RETRIEVAL UNIT
23 MATCHING UNIT
24 ESTIMATION UNIT
25 IMAGE ACQUISITION UNIT
26 REAL-TIME POSITIONING UNIT
27 CORRECTION UNIT
30 MAP GENERATION DEVICE
31 ACQUISITION UNIT
32 SfM EXECUTION UNIT
40 POSITIONING DEVICE
41 NOISE REMOVAL UNIT

What is claimed is:

1. A positioning device comprising:
at least one memory storing instructions, and
at least one processor configured to execute the instructions to;
acquire an environmental map of a target area being generated by using an image processing technique for estimating a three-dimensional shape of a target included in a two-dimensional image, and a plurality of captured images being used for generating the environmental map;
extract, from a plurality of the captured images, a similar image having a feature vector similar to a feature vector determined based on a feature amount included in an input image; and
estimate a position and an attitude of an imaging device that has captured the input image by using a first feature point group of the input image and a third feature point group in the environmental map associated to a second feature point group of the similar image being matched with the first feature point group, wherein
the at least one processor is further configured to execute the instructions to compare a feature vector determined based on a feature amount included in the input image with a feature vector determined based on a feature amount included in each of the captured images, and extract a plurality of the captured images as the similar image in a descending order of similarity score; and
the at least one processor is further configured to execute the instructions to increase the number of similar images to be extracted from a plurality of the captured images in a case where the number of matching at a time of matching the first feature point group of the input image and the second feature point group of a plurality of the captured images being extracted as the similar image is lower than a threshold value of the number of matching, and decrease the number of similar images to be extracted from a plurality of the captured images in a case where the number of matching exceeds the threshold value of the number of matching.

2. The positioning device according to claim 1, wherein the at least one processor is further configured to execute the instructions to compare a feature vector determined based on a feature amount included in the input image with a feature vector determined based on a feature amount included in each of the captured images, and extract the captured image indicating a highest similarity score from the environmental map as the similar image.

3. The positioning device according to claim 1, wherein the at least one processor is further configured to execute the instructions to extract a plurality of the captured images indicating a similarity score higher than a score threshold value, as the similar image.

4. The positioning device according to claim 3, wherein the at least one processor is further configured to execute the instructions to decrease the score threshold value in a case where the number of matching at a time of matching the first feature point group of the input image and the second feature point group of a plurality of the captured images being extracted as the similar image is lower than a threshold value of the number of matching, and increase the score threshold value in a case where the number of matching exceeds the threshold value of the number of matching.

5. The positioning device according to claim 1, wherein the at least one processor is further configured to execute the instructions to remove a point that becomes noise, based on distance information from a position of the imaging device to each of points included in the third feature point group.

6. The positioning device according to claim 1, wherein the at least one processor is further configured to execute the instructions to:
position a real-time position and a real-time attitude of the imaging device by using the input image; and
correct a position and an attitude of the imaging device by using a position and an attitude of the imaging device.

7. An estimation method comprising:
acquiring an environmental map of a target area being generated by using an image processing technique for estimating a three-dimensional shape of a target included in a two-dimensional image, and a plurality of captured images being used for generating the environmental map;
comparing a feature vector determined based on a feature amount included in an input image with a feature vector determined based on a feature amount included in each of the captured images;
extracting a plurality of the captured images as a similar image in a descending order of similarity score;
increasing the number of similar images to be extracted from a plurality of the captured images in a case where the number of matching at a time of matching a first feature point group of the input image and a second feature point group of a plurality of the captured images being extracted as the similar image is lower than a threshold value of the number of matching, and decreasing the number of similar images to be extracted from a plurality of the captured images in a case where the number of matching exceeds the threshold value of the number of matching; and estimating a position and an attitude of an imaging device that has captured the input image by using a first feature point group of the input image and a third feature point group in the environmental map associated to a second feature point group of the similar image being matched with the first feature point group.

8. The estimation method according to claim 7, further comprising, when extracting the similar image, comparing a feature vector determined based on a feature amount included in the input image with a feature vector determined based on a feature amount included in each of the captured images, and extracting a plurality of the captured images as the similar image in a descending order of similarity score.

9. The estimation method according to claim 7, further comprising, when estimating a position and an attitude of the imaging device, removing a point that becomes noise, based on distance information from a position of the imaging device to each of points included in the third feature point group.

10. A non-transitory computer-readable medium storing a program causing a computer to execute:

acquiring an environmental map of a target area being generated by using an image processing technique for estimating a three-dimensional shape of a target included in a two-dimensional image, and a plurality of captured images being used for generating the environmental map;

comparing a feature vector determined based on a feature amount included in an input image with a feature vector determined based on a feature amount included in each of the captured images;

extracting a plurality of the captured images as a similar image in a descending order of similarity score;

increasing the number of similar images to be extracted from a plurality of the captured images in a case where the number of matching at a time of matching a first feature point group of the input image and a second feature point group of a plurality of the captured images being extracted as the similar image is lower than a threshold value of the number of matching, and decreasing the number of similar images to be extracted from a plurality of the captured images in a case where the number of matching exceeds the threshold value of the number of matching; and estimating a position and an attitude of an imaging device that has captured the input image by using a first feature point group of the input image and a third feature point group in the environmental map associated to a second feature point group of the similar image being matched with the first feature point group.

11. The non-transitory computer-readable medium storing the program according to claim 10, further causing a computer to execute, when extracting the similar image, comparing a feature vector determined based on a feature amount included in the input image with a feature vector determined based on a feature amount included in each of the captured images, and extracting a plurality of the captured images as the similar image in a descending order of similarity score.

12. The non-transitory computer-readable medium storing the program according to claim 10, further causing a computer to execute, when estimating a position and an attitude of the imaging device, removing a point that becomes noise, based on distance information from a position of the imaging device to each of points included in the third feature point group.

* * * * *